United States Patent [19]
Appel et al.

[11] Patent Number: 6,055,005
[45] Date of Patent: Apr. 25, 2000

[54] COLOR PRINTER WITH JITTER SIGNATURE MATCHING

[75] Inventors: James J. Appel, Rochester; William J. Nowak, Webster, both of N.Y.

[73] Assignee: Xerox Corporation, Stamford, Conn.

[21] Appl. No.: 09/004,455

[22] Filed: Jan. 8, 1998

[51] Int. Cl.[7] .......................... B41J 2/385; G03G 15/041
[52] U.S. Cl. ......................... 347/116; 347/134; 399/202
[58] Field of Search ..................... 347/116, 118, 347/134, 241, 243, 244, 237, 251, 258, 259, 260, 261; 346/150.1, 107.3, 107.5, 45; 399/118, 202; 358/497, 296, 300, 302, 481

[56] References Cited

U.S. PATENT DOCUMENTS

| | | | |
|---|---|---|---|
| 4,750,045 | 6/1988 | Ohara et al. ........................ | 358/481 X |
| 5,315,112 | 5/1994 | Harris ....................................... | 358/481 |
| 5,315,321 | 5/1994 | Peled et al. .......................... | 347/241 X |
| 5,498,869 | 3/1996 | Appel et al. ............................ | 250/236 |
| 5,674,656 | 10/1997 | Maniar ................................... | 430/137 |
| 5,821,971 | 10/1998 | Rauch et al. ............................ | 347/134 |

Primary Examiner—William Royer
Assistant Examiner—Hoan Tran
Attorney, Agent, or Firm—John M. Kelly

[57] ABSTRACT

Correcting color banding problems resulting from facet-to-facet jitter in a color imaging device having a multifaceted polygon are corrected by starting each color separation using the same facet. This facet synchronization has been shown to reduce the objectionable color banding. Imaging offsets that result from either advancing or retarding the exposure of a latent image such that the latent image begins with the same facet as other latent images are compensated for using a rotating cylinder mirror whose rotation is controlled by a piezoelectric element.

19 Claims, 3 Drawing Sheets

COLOR PRINTER WITH JITTER SIGNATURE MATCHING

FIELD OF THE INVENTION

This invention relates to imaging devices that use rotating, multifaceted polygon scanners. In particular, this invention relates to a method of correcting color banding due to facet-to-facet jitter.

BACKGROUND OF THE INVENTION

Electrophotographic marking is a well known and commonly used method of copying or printing documents. Electrophotographic marking is performed by exposing a light image representation of a desired document onto a substantially uniformly charged photoreceptor. In response to that light image the photoreceptor discharges, creating an electrostatic latent image of the desired document on the photoreceptor's surface. Toner particles are then deposited onto that latent image, forming a toner image. That toner image is then transferred from the photoreceptor onto a substrate such as a sheet of paper. The transferred toner image is then fused to the substrate, usually using heat and/or pressure, thereby creating a copy of the desired image. The surface of the photoreceptor is then cleaned of residual developing material and recharged in preparation for the production of another image.

The foregoing broadly describes a prototypical black and white electrophotographic printing machine. Electrophotographic marking can also produce color images by repeating the above process once for each color of toner that is used to make the composite color image. The various color toner can then be transferred onto a substrate in a superimposed registration so that a desired composite color image results. That composite color image can then be fused to make a permanent image.

One way of exposing the photoreceptor is to use a Raster Output Scanner (ROS). A ROS is usually comprised of a laser light source (or sources) and a rotating polygon having a plurality of mirrored facets. The light source radiates a laser beam onto the polygon facets. The facets reflect the light onto the photoreceptor where a light spot is produced. As the polygon rotates the spot traces lines, referred to as scan lines, on the photoreceptor. Since the photoreceptor itself usually moves, the surface of the photoreceptor is raster scanned by the spot. During scanning the laser beam is modulated to produce a latent image on the photoreceptor. Then, depending upon the printer's configuration, the laser beam can be modulated to produce a latent image for each color of toner to be developed.

While raster output scanning is successful, it has problems. One set of problems results from facet imperfections. While each facet of the polygon is ideally both perfectly flat and perfectly parallel to the axis of rotation of the polygon, and while each facet is ideally identical to the others, and while each facet ideally forms the same angle with its adjacent facets, in practice these ideals are not achieved. Specifically important to the present invention are the facts that polygon facets are not perfectly flat and that the angles between adjacent facets are not identical. These imperfections cause the scan lines produced by different facets to be nonuniform in linearity and length and to start in different places. By using a start of scan detector the modulation of the various scan lines can be adjusted such that the latent image is aligned along one edge. That is, all scan lines start in the same place.

However, this does little to help other problems resulting from facet imperfections. For example, non-flat facets result in spatial nonuniformity: the spot is not where it should be at a particular time. Additionally, facet angle errors result in scan lines that trace across the photoreceptor at different rates and that end at different times. Color print testing performed at Xerox has proven that facet imperfections result in objectionable color defects that are referred to herein as color banding. Color banding results from color image to color image misregistration. Therefore, a technique of reducing or eliminating color banding would be beneficial.

SUMMARY OF THE INVENTION

This invention relates to a technique of reducing or eliminating color banding in a composite color image that is derived from a plurality of superimposed raster scanned color images. According to the principles of the present invention the first scan line of each raster scanned color image is produced using the same facet. Beneficially, if the same number of scan lines exist in each raster scanned color image then corresponding scan lines in all of the images are produced using the same facet. The scan line offsets that are required to properly register each raster scanned color image are produced using a cylinder mirror that is moved by a piezoelectric element.

BRIEF DESCRIPTION OF THE DRAWINGS

Other aspects of the present invention will become apparent as the following description proceeds and upon reference to the following drawings, in which like reference numerals identify like elements and wherein.

DETAILED DESCRIPTION OF A PREFERRED EMBODIMENT OF THE INVENTION

Figure 1:
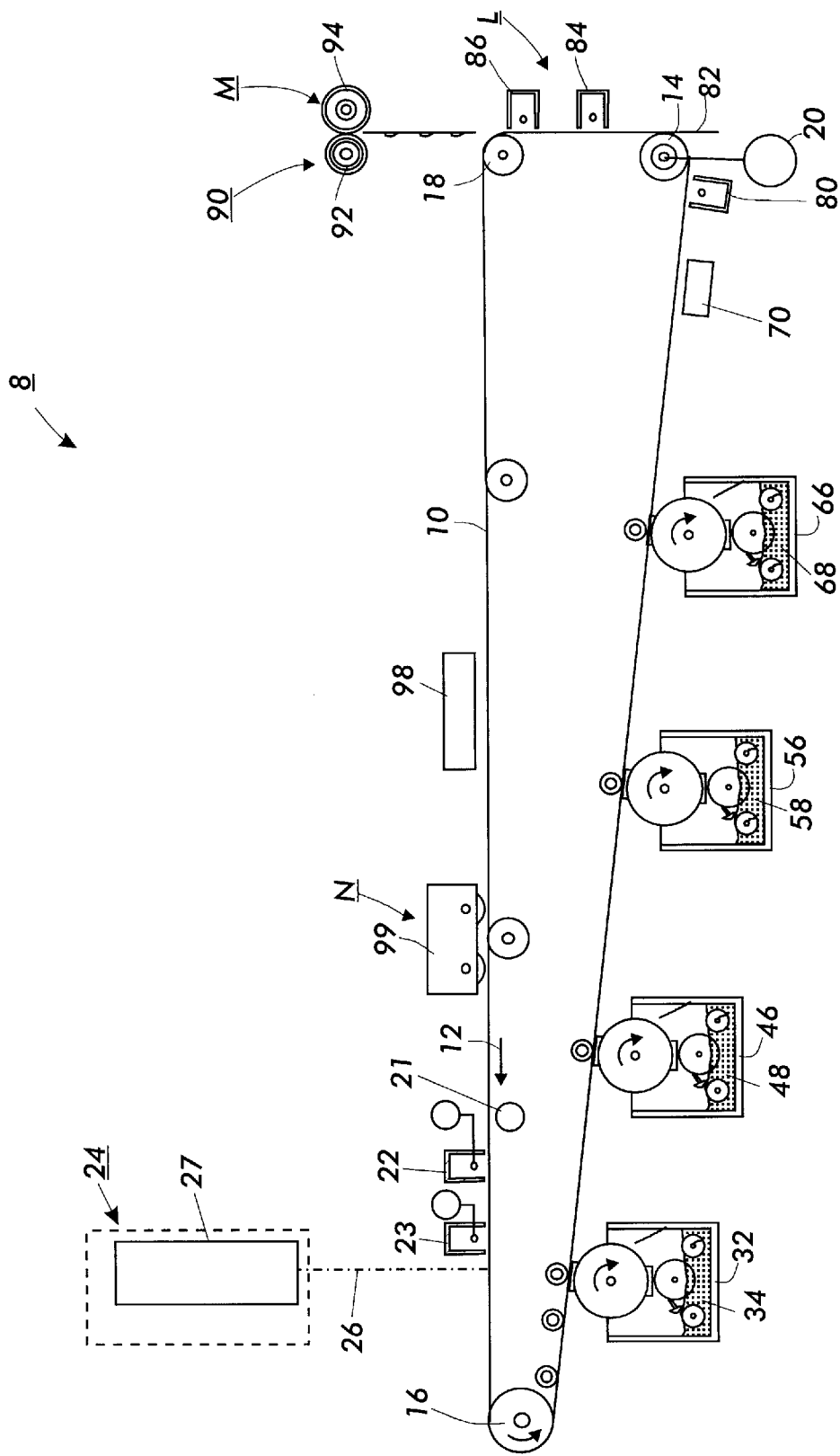
FIG. 1 shows an electrophotographic printing machine that incorporates the principles of the present invention.

FIG. 1 illustrates an electrophotographic printing machine 8 that is in accord with the principles of the present invention. It is to be understood that the present invention can be used in many machines and systems other than that which is specifically illustrated. However, understanding how the present invention is used in the printing machine 8 will assist the understanding of the invention.

The printing machine 8 includes an Active Matrix (AMAT) photoreceptor belt 10 which travels in the direction indicated by the arrow 12. Belt travel is brought about by mounting the photoreceptor belt about a driven roller 14 and tension rollers 16 and 18. The driven roller 14 is driven by a motor 20.

As the photoreceptor belt travels each part of it passes through each of the subsequently described process stations. For convenience, a single section of the photoreceptor belt, referred to as the image area, is identified. The image area is that part of the photoreceptor belt which is to receive the various toner layers which, after being transferred and fused to a substrate, produce the final color image. While the photoreceptor belt may have numerous image areas, since each image area is processed in the same way a description of the processing of one image area suffices to fully explain the operation of the printing machine.

The imaging process begins with the image area passing a "precharge" erase lamp 21 that illuminates the image area so as to cause any residual charge which might exist on the image area to be discharged. Such erase lamps are common in high quality systems and their use for initial erasure is well known.

As the photoreceptor belt continues its travel the image area passes a charging station comprised of a DC corotron 22 and an AC scorotron 23. During this first pass of the image area through the printing machine 8 the DC corotron charges the image area in preparation for exposure to create a latent image for black toner. For example, the DC corotron might charge the image area to a substantially uniform potential of about −500 volts. It should be understood that the actual charge placed on the photoreceptor will depend upon many variables, such as the black toner mass that is to be developed and the settings of the black development station (see below). As is explained subsequently the AC scorotron 23 is used in subsequent passes of the image area through the printing machine 8.

After passing the charging station the image area advances to an exposure station 24. At the exposure station the charged image area is exposed to a modulated laser beam 26 from a raster output scanner 27 that raster scans the image area such that an electrostatic latent representation of a black image is produced. For example, illuminated sections of the image area might be discharged by the beam 26 to about −100 volts. Thus after exposure the image area has a voltage profile comprised of relatively high voltage areas of about −500 volts and of relatively low voltage areas of about −100 volts.

Figure 2:
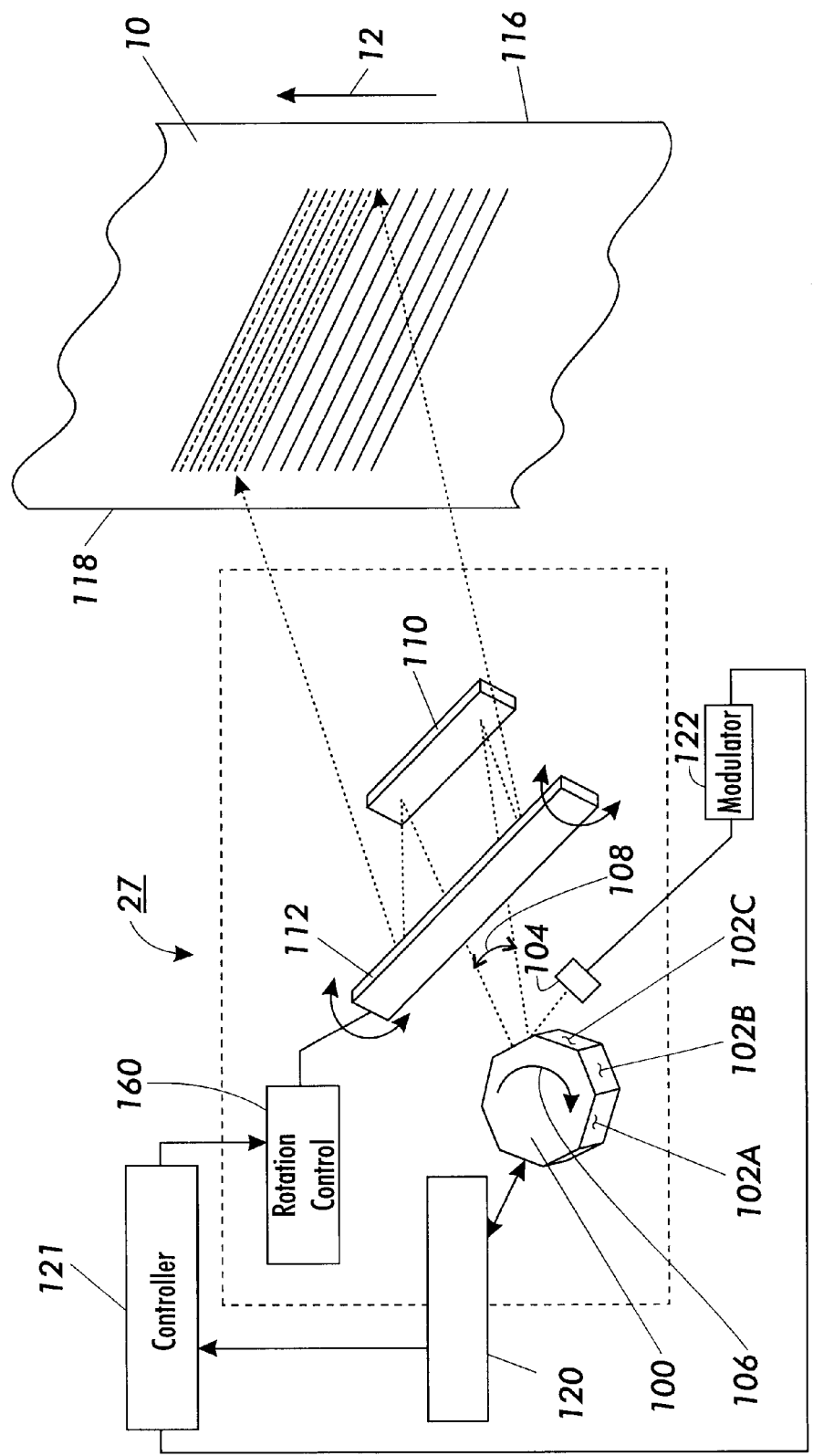
FIG. 2 illustrates the operation of a multifaceted raster output scanner according to the principles of the present invention that is raster scanning a photoreceptor.

The printing machine 8 beneficially departs from prior art REaD printing machines in the configuration of the raster output scanner. FIG. 2 illustrates the raster scanning of the photoreceptor 12 in more detail. The printing machine 8 includes a polygon 100 having a plurality of facets, the facets 102A, 102B, and 102C, and five other facets that are not specifically enumerated. As shown, a laser 104 generates the laser beam 26 which illuminates a facet. Since the polygon 100 rotates in the direction 106 the laser beam 26 sweeps through an angle 108. The sweeping laser beam 26 is reflected from a first mirror 110, then from a rotating cylinder mirror 112, and finally the sweeping beam sweeps a scan line on the photoreceptor 10. The polygon 100, laser 104, first mirror 110, and cylinder mirror 112 are all located within the raster output scanner 27.

As mentioned in the "Background of the Invention" the polygon facets are not perfect, that is, facet 102A is slightly different than facet 102B, which is different than facet 102C, and so on. These differences cause each scan line to have a different amount of nonuniformity. However, the use of a start of scan detector (not shown) and the cylindrical mirror 112 compensate for some scan line nonuniformities. For example, a start of scan detector can assist synchronization such that the modulation of each scan line starts with the spot at the same distance from an edge 116 and the cylindrical mirror compensates for scan line wobble. However, neither the start of scan detector nor the cylindrical mirror correct for scan line nonlinearity. That is, as the scan line sweeps toward the edge 118, facet imperfections cause the position of the spot produced by the laser beam 26 at a given time after the start of scan to vary from scan line to scan line. This is important in what follows.

Referring once again to FIG. 1, after passing the exposure station 24 the exposed image area with the black latent image passes a black development station 32 that advances black toner 34 onto the image area so as to develop a black latent image. While the black development station 32 could be a magnetic brush developer, a scavengeless developer may be somewhat better. One benefit of scavengeless development is that it does not disturb previously deposited toner layers. Biasing is such as to effect discharged area development (DAD) of the lower (less negative) of the two voltage levels on the photoreceptor. The charged black toner 34 adheres to the exposed areas of the image area, thereby causing the voltage of the illuminated parts of the image area to be about −200 volts. The non-illuminated parts of the image area remain at about −500 volts.

After passing the black development station 32 the image area advances to the charging station. The DC corotron 22 and the AC scorotron 23 then recharge the image area and its black toner layer using a technique known as split recharging. Split recharging is described in U.S. Pat. No. 5,600,430, which issued on Feb. 4, 1997, and which is entitled, "Split Recharge Method and Apparatus for Color Image Formation." Briefly, the DC corotron 22 overcharges the image are to a voltage level greater than that desired when the image area is recharged, while the AC scorotron reduces that voltage level to that which is desired. Split recharging serves to substantially eliminate voltage differences between toned areas and untoned areas and to reduce the level of residual charge remaining on the previously toned areas. This benefits subsequent development by different toners.

The recharged image area with its black toner layer then advances to the exposure station. There the laser beam 26 exposes the image area to produce an electrostatic latent representation of a yellow image.

Significantly, the modulation of the laser beam is controlled such that the first scan line of the yellow image is scanned using the same facet as the first scan line of the black image. Referring now to FIG. 2, facet synchronization is achieved using a facet detector 120 that detects when a predetermined facet is in position to be illuminated by the laser 104. The facet detector applies a synchronizing signal to a controller 121 that, in turn outputs signals to a modulator 122 that causes the modulator to synchronize laser beam modulation with the facets. Since the yellow image has the same number of scan lines as the black image, beginning the yellow image with the same facet as the black image means that corresponding scan lines in the two images are produced using the same facet.

It should be noted that a facet detector is not absolutely required. For example, the polygon might be rotated using either a stepper motor or a synchronized AC motor. By tracking the signals to the motor, such as by counting pulses or by counting input cycles, and by taking into consideration the number of facets on the polygon, it is possible to know when a particular facet is in position to be illuminated by the laser 104.

Simply synchronizing images such that the first scan line of each image is produced using the same facet would create scan line offset errors. To understand this, refer to FIG. 2. As the polygon 100 rotates, if the correct polygon facet is not illuminated when the image area is such that the latent images are registered (that is, in an overlapping relationship so as to arrive at the desired composite image), then the modulation of the laser beam will have to adjusted such that the correct facet is illuminated. Adjustment could be performed by either advancing or retarding the modulation. However, the photoreceptor is advancing in the direction 12. Simply adjusting the laser modulation causes the image area to be offset in the process direction 12.

Figure 3:
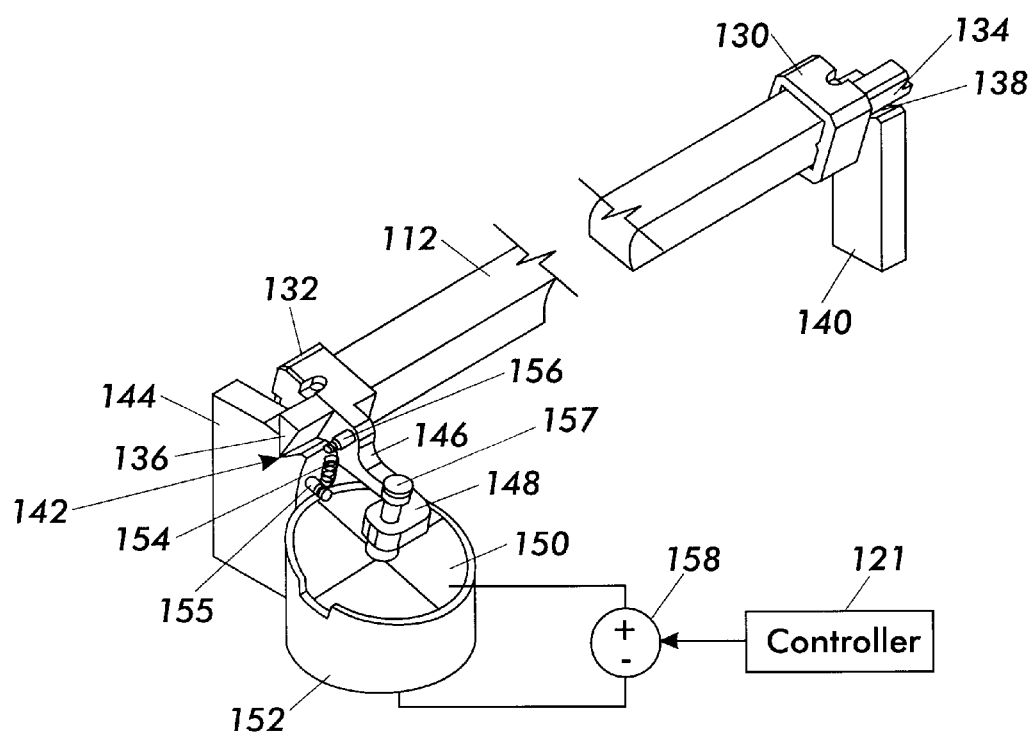
FIG. 3 illustrates a beneficial system for mounting a cylindrical mirror to a piezoelectric cylinder mirror beam mover.

A scheme for correcting process direction offsets is described with reference to FIG. 3. As shown, end caps 130 and 132 are placed on the cylindrical mirror 112. The end cap 130 has a knife edge 134 while the end cap 132 has a knife edge 136. The knife edge 134 fits into a notch 138 of a stand 140, and the knife edge 136 fits into a notch 142 of a stand 144. The cylinder mirror thus pivots about the notches 138 and 142.

The end cap 132 includes a lever arm 146 that terminates in a threaded coupling 148. Below the threaded coupling is a piezoelectric element 150 in a support 152. A spring 154 stretched between a stand pin 155 and a lever pin 156 biases the lever arm toward the piezoelectric element 150. A screw 157 passing through a threaded coupling contacts the piezoelectric element. By adjusting the screw the pivot of the cylinder mirror can be adjusted.

A controlled voltage source 158 is applied to the piezoelectric element. As is well known, a bias applied to a piezoelectric element causes the piezoelectric element to expand or contract, depending upon the polarity. With the arrangement shown in FIG. 3 the controlled voltage source causes the cylindrical mirror 112 to pivot. The components 130–158 comprise a rotation control system 160 shown in FIG. 2.

The axis of rotation of the cylinder mirror 112 is beneficially carefully chosen and controlled. It should run parallel to the axis of formation of the cylinder mirror itself. The axis of rotation of the cylinder mirror should also run tangential to the surface of the cylinder mirror.

To correct for process direction offsets resulting from either advancing or delaying the modulation applied to the laser such that the same polygon facet is used to produce the first scan line in every image, the controller 121 causes the controlled voltage source 158 to apply a voltage to the piezoelectric element 150 such that the cylinder mirror pivots the proper amount such that the first scan lines of all of the images are registered. By facet tracking using the facet detector 120, and by knowing the speed of the photoreceptor in the direction 12, the controller 121 determines the required expansion or contraction of the piezoelectric element such that when the first line of the yellow latent image is imaged using the same facet as the first line of the black image that those latent images are registered.

Turning once again to FIG. 1, the now re-exposed image area advances to a yellow development station 46 that deposits yellow toner 48 onto the image area. After passing the yellow development station the image area advances once again to the charging station. There, the DC corotron 22 and the AC scorotron 23 again recharge the image area using split recharging. The recharged image area with its black and yellow toners then advances once again to the exposure station.

The exposure station then exposes the image area to produce an electrostatic latent representation of a magenta image. Once again, the first scan line of the magenta image is produced using the same facet as that which produced the black and yellow images. If the correct polygon facet is not being illuminated by the laser when the magenta image area is registered with the black and yellow toner layers, the cylindrical mirror is rotated by the piezoelectric element as described above so that the images are registered.

After passing the magenta exposure station the now re-exposed image area advances to a magenta development station 56 that deposits magenta toner 58 onto the image area. After passing the magenta development station the image area advances yet again to the charging station where the DC corotron and the AC scorotron split recharge the image area.

The now recharged image area with its black, yellow, and magenta toner layers then advances once again to the exposure station. That station exposes the image area to produce an electrostatic latent representation of a cyan image. The exposure station then exposes the image area to produce an electrostatic latent representation of a cyan image. Once again, the first scan line of the cyan image is produced using the same facet as that which produced the black, yellow, and magenta images. If the correct polygon facet is not being illuminated by the laser when the cyan image area is registered with the other toner layers, the cylindrical mirror is rotated by the piezoelectric element as described above such that the images are registered.

After passing the exposure station the now re-exposed image area advances past a cyan development station 66 that deposits cyan toner 68 onto the image area. At this time four colors of toner are on the image area, resulting in a composite color image. However, the composite color toner image is comprised of individual toner particles which have charge potentials which vary widely. Directly transferring such a composite toner image onto a substrate would result in a degraded final image. Therefore it is beneficial to prepare the composite color toner image for transfer.

To prepare for transfer a pretransfer erase lamp 70 discharges the image area to produce a relatively low charge level on the image area. The image area then passes a pretransfer DC scorotron 80 which performs a pre-transfer charging function. The image area continues to advance in the direction 12 past the driven roller 14. A substrate 82 is then placed over the image area using a sheet feeder (which is not shown). As the image area and substrate continue their travel they pass a transfer corotron 84 that applies positive ions onto the back of the substrate 81. Those ions attract the negatively charged toner particles onto the substrate.

As the substrate continues its travel is passes a detack corotron 86. That corotron neutralizes some of the charge on the substrate to assist separation of the substrate from the photoreceptor 10. As the lip of the substrate 82 moves around the tension roller 18 the lip separates from the photoreceptor. The substrate is then directed into a fuser 90 where a heated fuser roller 92 and a pressure roller 94 create a nip through which the substrate 82 passes. The combination of pressure and heat at the nip causes the composite color toner image to fuse into the substrate. After fusing, a chute, not shown, guides the substrate to a catch tray, also not shown, for removal by an operator.

After the substrate 82 is separated from the photoreceptor belt 10 the image area continues its travel and passes a preclean erase lamp 98. That lamp neutralizes most of the charge remaining on the photoreceptor belt. After passing the preclean erase lamp the residual toner and/or debris on the photoreceptor is removed at a cleaning station 99. The image area then passes once again to the precharge erase lamp 21 and the start of another printing cycle.

Using well known technology the various machine functions described above are generally managed and regulated by the controller 121.

It is to be understood that while the figures and the above description illustrate the present invention, they are exemplary only. Others who are skilled in the applicable arts will recognize numerous modifications and adaptations of the illustrated embodiments which will remain within the principles of the present invention. Therefore, the present invention is to be limited only by the appended claims.

What is Claimed:

1. An image forming apparatus, comprising:
   a charged photoreceptor moving in accordance with a motion signal;
   a light source emitting a light beam that is modulated in accordance with a modulation signal;
   a rotating polygon having a plurality of facets for reflecting the emitted light beam;
   a cylindrical mirror rotatable around an axis, said cylindrical mirror for directing the reflected light beam onto said moving photoreceptor;
   a controller producing said motion signal, said controller also producing said modulation signal so as to form a first latent image, comprised of a first scan line followed by a plurality of subsequent scan lines, on said photoreceptor;
   a rotation inducing element responsive to a position signal, said rotation inducing element causing said cylindrical mirror to rotate about said axis in response to said position signal; and
   a facet determining element producing a synchronization signal when a first facet of said plurality of facets is reflecting light onto said cylindrical mirror;
   wherein said controller receives said synchronization signal and produces said modulation signal so as to form a second latent image, comprised of a first scan line followed by a plurality of subsequent scan lines, on said photoreceptor such that the facet that produced the first scan line in said first latent image produces the first scan line in said second latent image, and wherein said controller produces said position signal such that the cylindrical mirror rotates to a position such that the second latent image is registered with said first latent image.

2. An image forming apparatus according to claim 1, wherein said first latent image area and said second latent image area overlap.

3. An image forming apparatus according to claim 1, wherein said light source is a laser diode.

4. An image forming apparatus according to claim 1, wherein said rotation inducing element includes a piezoelectric element.

5. An image forming apparatus according to claim 1, further including a mounting assembly for said cylindrical mirror.

6. An image forming apparatus according to claim 5, wherein said rotation inducing element includes a piezoelectric element.

7. An image forming apparatus according to claim 6, wherein said mounting assembly includes a lever arm and a spring, wherein an end of said lever arm contacts said rotation inducing element and where said spring biases said lever arm toward said rotation inducing element.

8. A color printing machine, comprising:
   a charged photoreceptor moving in accordance with a motion signal;
   a light source emitting a light beam that is modulated in accordance with a modulation signal;
   a rotating polygon having a plurality of facets for reflecting the emitted light beam;
   a cylindrical mirror rotatable around an axis, said cylindrical mirror for directing the reflected light beam onto said moving photoreceptor;
   a controller producing said motion signal, said controller also producing said modulation signal so as to form a first latent image, comprised of a first scan line followed by a plurality of subsequent scan lines, on said photoreceptor;
   a first developing station for depositing toner on said first latent image;
   a rotation inducing element responsive to a position signal, said rotation inducing element causing said cylindrical mirror to rotate about said axis in response to said position signal;
   a facet determining element producing a synchronization signal when a first facet of said plurality of facets is reflecting light onto said cylindrical mirror;
   wherein said controller receives said synchronization signal and produces said modulation signal so as to form a second latent image, comprised of a first scan line followed by a plurality of subsequent scan lines, on said photoreceptor such that the facet that produced the first scan line in said first latent image produces the first scan line in said second latent image, and wherein said controller produces said position signal such that the cylindrical mirror rotates to a position such that the second latent image is registered with said first latent image; and
   a second developing station for depositing toner on said second latent image.

9. A color printing machine according to claim 8, further including a transfer station for transferring toner on said first latent image area and toner on said second latent image area onto a substrate.

10. A color printing machine according to claim 9, further including a fusing station for fusing toner with a substrate.

11. A color printing machine according to claim 8, wherein said first latent image area and said second latent image area overlap.

12. A color printing machine according to claim 8, wherein said light source is a laser diode.

13. A color printing machine according to claim 8, wherein said rotation inducing element includes a piezoelectric element.

14. A color printing machine according to claim 8, further including a mounting assembly for said cylindrical mirror.

15. A color printing machine according to claim 14, wherein said rotation inducing element includes a piezoelectric element.

16. A color printing machine according to claim 15, wherein said mounting assembly includes a lever arm and a spring, wherein an end of said lever arm contacts said rotation inducing element and where said spring biases said lever arm toward said rotation inducing element.

17. A method of producing a color image comprising the steps of:
   producing a first latent image, comprised of a first scan line and a plurality of subsequent scan lines, on a moving photoreceptor using a light source and a multifaceted rotating polygon that produce a sweeping beam of light that is reflected from a rotatable cylinder mirror;
   identifying the polygon facet that imaged the first scan line of said first latent image;
   producing a second latent image, comprised of a first scan line and a plurality of subsequent scan lines, on the moving photoreceptor using the same polygon facet that produced the first scan line of the first latent image, and
   causing the second latent image to be registered with the first latent image by rotating the cylinder mirror.

18. The method according to claim 17, wherein the step of causing the second latent image to be registered with the first latent image includes the step of applying a correction signal to a rotation inducing element.

19. The method according to claim 18 wherein the rotation inducing element is a piezoelectric element.

* * * * *